US005286379A

United States Patent [19]

Jackson

[11] Patent Number: 5,286,379

[45] Date of Patent: Feb. 15, 1994

[54] OIL-SPILL CLEAN UP APPARATUS

[76] Inventor: Gilbert R. Jackson, 108 S. Myrtlewood St., West Covina, Calif. 91791

[21] Appl. No.: 934,407

[22] Filed: Aug. 24, 1992

[51] Int. Cl.[5] .......................... B04B 15/00; C02F 1/38

[52] U.S. Cl. .............................. 210/242.3; 210/512.1; 210/923; 494/31; 494/70; 494/901

[58] Field of Search .................. 210/242.3, 923, 512.1, 210/512.2, 787; 494/31, 34, 70, 901

[56] References Cited

U.S. PATENT DOCUMENTS

| | | | |
|---|---|---|---|
| 1,782,028 | 11/1930 | Burch | 494/901 |
| 2,266,553 | 12/1941 | Jones | 494/901 |
| 2,526,292 | 10/1950 | Staaff | 494/901 |
| 2,779,537 | 1/1957 | Madany | 494/34 |
| 3,630,432 | 12/1971 | Murkes | 494/901 |
| 3,635,342 | 1/1972 | Mourlon et al. | 210/242.3 |
| 3,656,619 | 4/1972 | Ryan et al. | 210/923 |
| 3,730,346 | 5/1973 | Prewitt | 210/923 |
| 3,907,684 | 9/1975 | Galicia | 210/242.3 |

*Primary Examiner*—Christopher Upton
*Attorney, Agent, or Firm*—Boniard I. Brown

[57] ABSTRACT

An oil recovery vessel is equipped with a substantial plurality of high efficiency centrifugal separators for separating oil from an oil-water mixture transported from an oil spill area into a piping system on the vessel. The separators are arranged in modules closely spaced within the vessel, a large number of separators being disposed in a relatively small space. Each separator module includes several separators driven by a single motor.

20 Claims, 5 Drawing Sheets

OIL-SPILL CLEAN UP APPARATUS

BACKGROUND OF THE INVENTION

1. Field of the Invention

The present invention relates to oil spill clean-up apparatus for removing oil spilled into navigable bodies of water, e.g., an ocean, lake or river. The apparatus comprises a ship or vessel, and a large plurality of centrifugal separators on the vessel for receiving an oil-water mixture pumped from the body of water into distribution piping on board the vessel.

2. Prior Art

Various types of oil-collecting systems have been devised for removing oil that has spilled into a large body of water, e.g., when an oil tanker has capsized or run aground.

U.S. Pat. No. 3,727,766 to Horne, et al., relates to a ship-mounted oil-collecting system including two floatable suction heads adapted to rest on an oil-water surface for pumping an oil-water mixture through flexible lines into a vacuum tank on a vessel. Periodically, the oil-water mixture is transferred from the vacuum tank to a larger holding tank. The system is designed to provide a continuous suction force on the suction heads, even if the suction heads should temporarily be lifted out of the water for any reason.

U.S. Pat. No. 3,844,944 to Mercuri shows an on-board oil-water separator comprising a series of tanks of graduated height and arranged so that the oil accumulates as a surface layer on the water in each tank. The liquids are selectively drawn from each tank to achieve a gradual separation of the oil from the water.

U.S. Pat. No. 4,921,605 to Chastan-Bagnis, et al., discloses a skimmer vessel having a longitudinal channel for directing an oil-water mixture upwardly into an elevated chamber. Water apparently flows downwardly out of the chamber through an evacuation duct, leaving waste materials in the elevated chamber.

U.S. Pat. No. 5,015,399 to Eller shows an oil recovery vessel having a pontoon structure arranged to float on the oil-water surface, and a submersible liquid intake tube means attached to the pontoon structure. An hydraulically-powered pump means is located within the tube means for pumping an oil-water mixture into a separator-means within the vessel.

Most of the noted prior arrangements do not appear to achieve complete separation of the oil from the oil-water mixture pumped into the vessel. In most cases, the oil separator action is a slow-going process that significantly limits the quantity of oil that can be effectively handled in any given time period.

SUMMARY OF THE INVENTION

The present invention is directed to an oil spill clean-up apparatus wherein an oil-water mixture is transported from a body of water into a large plurality of on-board centrifugal separators arranged in parallel flow relationship. Each separator handles a relatively small liquid volume, e.g., two or three gallons per minute. However, by employing a large number of separators in the system it is possible to process relatively large liquid volumes, e.g., two hundred thousand gallons per minute.

Each centrifugal separator is preferably of a known construction of the type used in the milk industry to separate butterfat from skim milk. The separation efficiencies of such separators are known to be relatively high, e.g., in excess of ninety-nine per cent. By using a large number of such separators in parallel flow relationship it is possible to process a relatively large total liquid volume, while at the same time achieving a very high separation efficiency.

The invention is concerned with physical arrangement of the centrifugal separators in modules, so arranged and constructed that each separator in the system handles such quantity of liquid that results in a reasonably high oil-water separation efficiency. Each separator is preferably provided with a pressure regulator or flow control device, whereby all separators in the system process similar quantities of liquid.

Each separator module preferably comprises two vertical rows of centrifugal separators, with the separators in each row arranged one above another in vertical alignment. Each separator in a given module has a vertical drive shaft disposed a given distance from an elongated drive shaft of an electric motor which powers all of the separators of that module. Power is transmitted from the motor to the separator drive shafts by sprocket-chain drive connections.

The number of centrifugal separators in each module can vary. However, typically each module will comprise at least eight individual separators, all driven from one electric motor.

The separator modules are configured as rectangular units, whereby individual modules can be arranged in side-by-side relation whereby a relatively large number of modules can be incorporated in a relatively small total space. The modules are preferably arranged in rows, with selected rows being spaced apart to accommodate walkways for maintenance personnel access to the separators in each module, even though the modules are positioned relatively close together in a relatively compact arrangement.

DESCRIPTION OF A PREFERRED EMBODIMENT OF THE INVENTION

Figure 1:
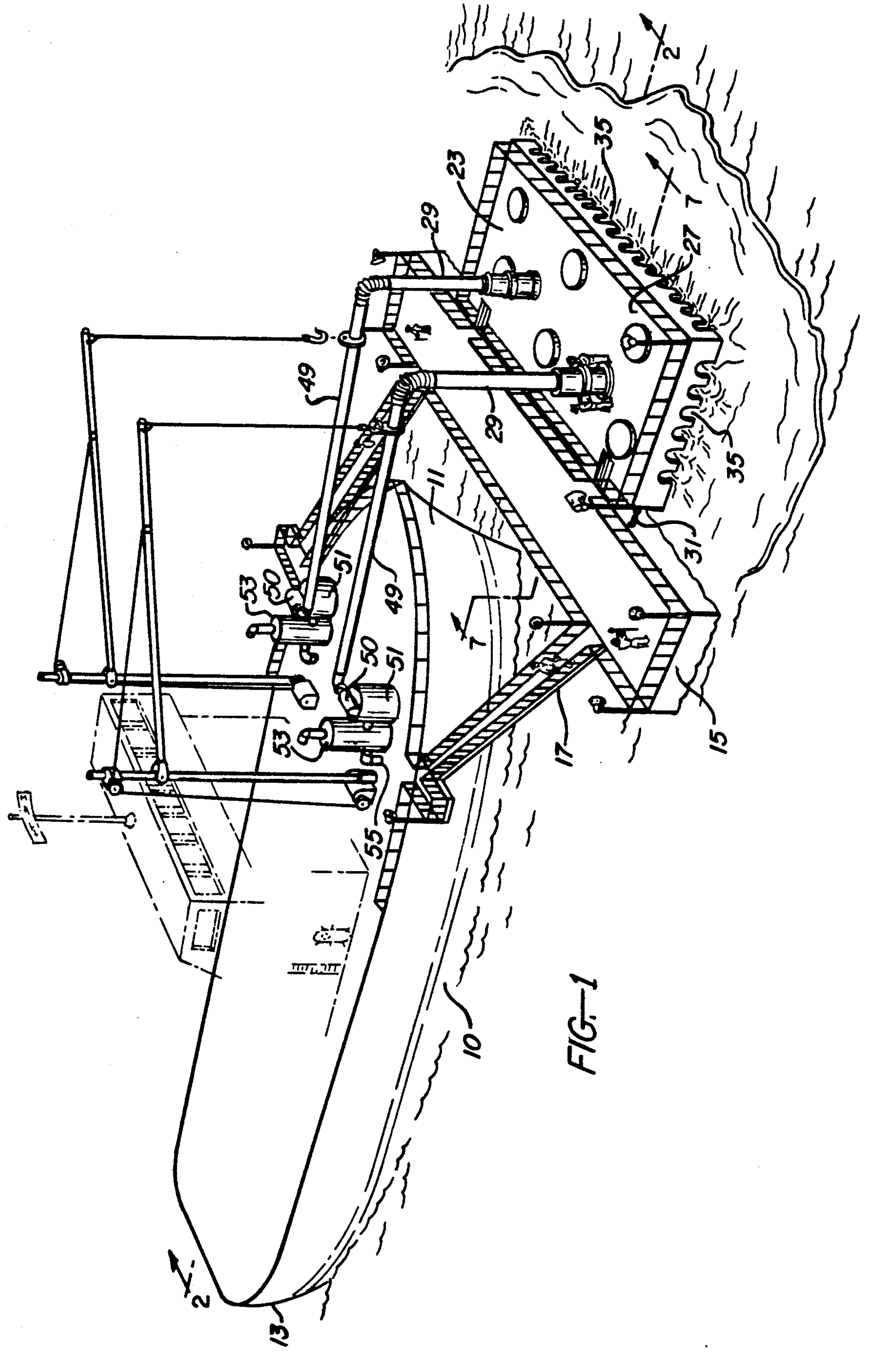
FIG. 1 is a perspective view of a ship with a floatable platform utilized with the invention for extracting a mixture of oil and water from a body of water.

Referring to the drawings, and particularly to FIGS. 1 through 4, there is shown a ship 10 having a bow 11 and a stern 13. A floatable platform 15 is connected to the ship via two swingable arms 17. Each swingable arm 17 has a pivotal connection 19 with the ship and a pivotal connection 21 with the platform, whereby the platform can float on the water surface without being too affected by pitching or rolling motions of the ship. Each pivotal connection 19 or 21 may be a universal connection having motion freedom in two orthogonal planes. Transverse strut means (not shown) may be provided between the bow of the ship and the pivot connections 21 to give the platform 15 transverse stability.

Located forwardly from platform 15 is a somewhat smaller platform 23 which has its peripheral edge defined by a hollow annular pontoon 25. A flat deck 27 overlies the annular pontoon to support two liquid extraction pipes 29.

Platforms 15 and 23 are loosely connected together so that platform 23 has maximum freedom to move up and down on the water surface, unimpeded by the larger platform 15. Links 31 may be connected between the two platforms to provide the required freedom of motion. Platform 15 acts as a transition from the ship to platform 23, whereby platform 23 is substantially unaffected by rolling or pitching of the ship.

Figure 4:
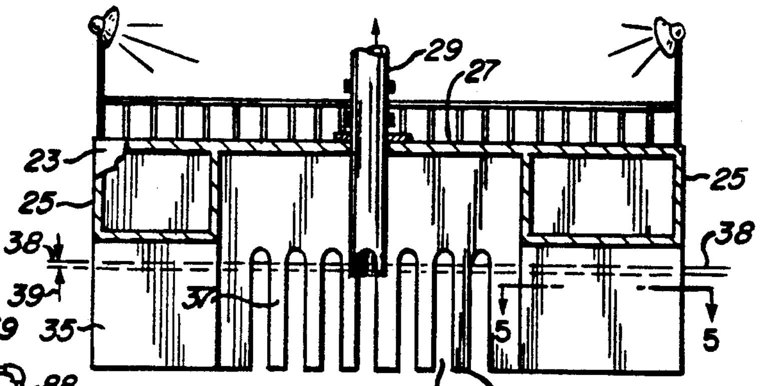
FIG. 4 is a sectional view taken through a floatable platform.
Figure 5:
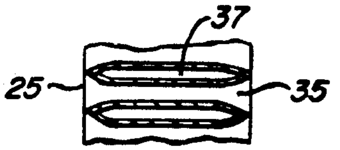
FIG. 5 is a fragmentary sectional view taken on line 5—5 in FIG. 4.

The lower portions 33 of pontoons 25 preferably have narrow passages 35 formed transversely therethrough, as shown in FIGS. 4 and 5. The depending pontoon sections 37 formed by passages 35 extend downwardly within the water body to provide floatation support for the platform. In FIG. 4 the water-oil surface is designated by numeral 38, with numeral 39 designating a layer of oil on the water body. Passages 35 are of sufficient height that oil can flow into the space circumscribed by the annular pontoon. The annular pontoon circumscribes a space that is connected to the surrounding water body, but is nevertheless relatively free of waves or abrupt changes in the condition of liquid surface 38.

Figure 6:
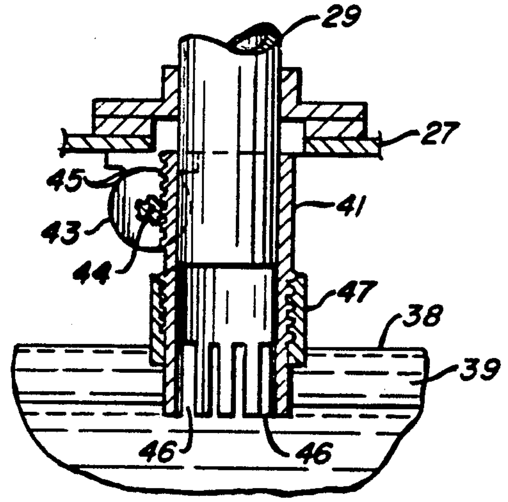
FIG. 6 is an enlarged view of an oil-extraction pipe used with the FIG. 4 platform, showing a mechanism for adjusting the penetration depth of the pipe into the oil-water surface.

Deck 27 supports two downwardly extending pipes 29. As shown in FIG. 6, the representative pipe 29 extends to a point below the deck. A sleeve 41 is slidable on the lower end of the pipe for vertical adjustment, whereby the pipe can effectively penetrate different distances into the oil layer, in accordance with the adjusted position of sleeve 41. The aim is to accommodate different platform loadings and oil layer thicknesses that might be encountered.

Any suitable mechanism may be used to adjust sleeve 41 on pipe 29. As shown in FIG. 6, the adjusting mechanism comprises an electric motor 43 having a speed reducer to drive a pinion gear 44 that is in mesh with a rack 45 formed on or attached to sleeve 41.

The lower end of sleeve 41 may be slotted, as at 46, so that the oil can flow through the slots to reach the interior of pipe 29. A threaded collar 47 may have a threaded connection with sleeve 41 to effectively adjust the vertical dimension of slots 46 to approximate or be slightly greater than the oil layer thickness, thus to enable pipe 29 to capture as much oil as possible, without allowing slots 46 to communicate with the atmosphere above surface 38. Some water is necessarily being drawn into the pipe along with the oil.

Figure 2:
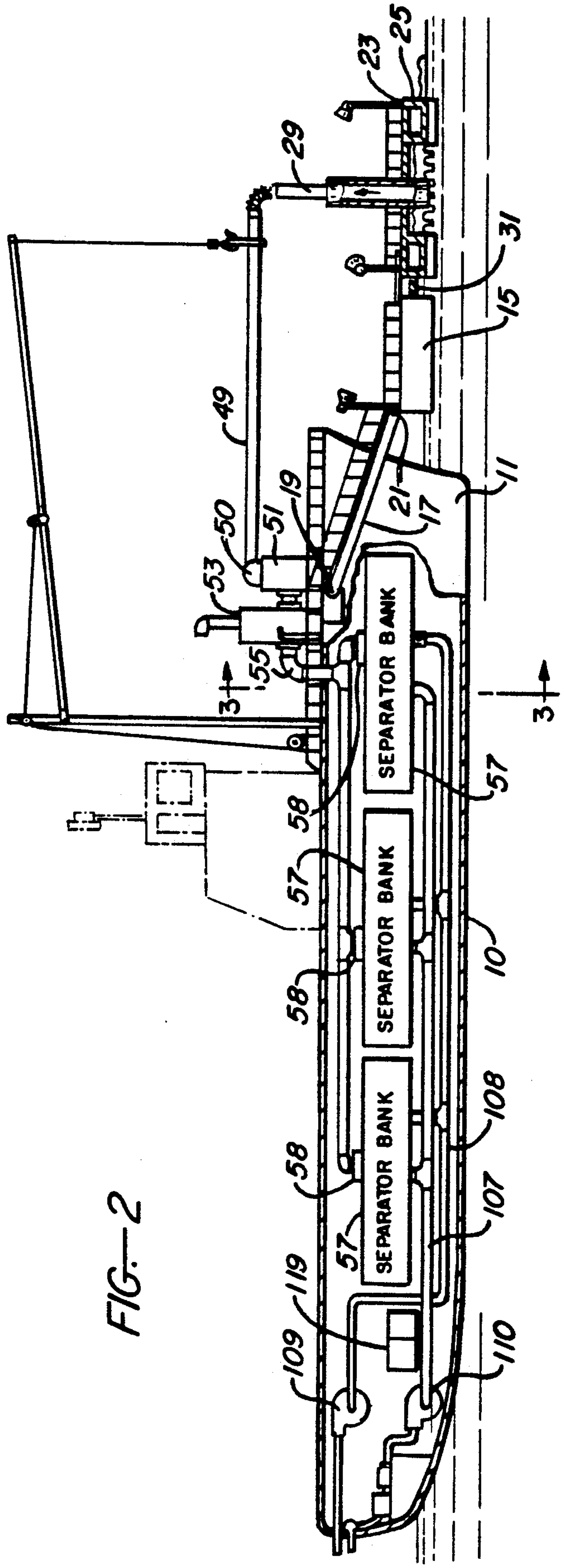
FIG. 2 is a side elevational view, partially broken away, of the FIG. 1 ship and platform of FIG. 1.

The oil-water mixture is pumped upwardly through pipes 29 into a generally horizontal pipe 49 which extends over the deck of the ship to a swivel connection 50 with a housing 51 (FIGS. 1 and 2). A pump (not shown) for transporting the oil-water mixture through pipes 29 and 49 may be located in housing 51 or on the deck 27 of platform 23.

The oil-water mixture is passed through heaters 53 and then into an associated vertical pipe 55, as indicated in FIG. 2. The purpose of each heater 53 is to reduce the oil viscosity in those situations where the oil may be too viscous to flow properly through the centrifugal separators, flow regulators, and small pipes located downstream from the heater. In some cases, the oil passing through pipes 29 and 49 may be sufficiently non-viscous that heaters 53 would not be needed. The heaters would in such cases remain inactive, the oil-water mixture flowing through the heaters unheated.

Figure 3:
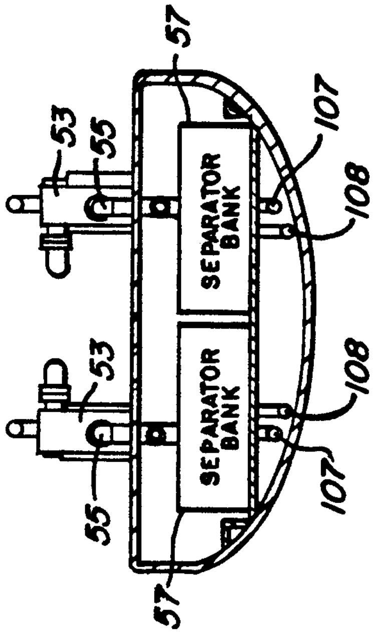
FIG. 3 is a transverse sectional view taken on line 3—3 in FIG. 2.

Referring to FIG. 2, the oil-water mixture flows from pipe 55 into three separate branch lines that lead downwardly into separator banks 57. Each separator bank has a pressure regulator 58 in its incoming supply line, whereby each bank receives approximately the same liquid volume. As shown in FIG. 3, there are duplicate separator banks located along each side of the vessel. Thus, there are six separator banks supplied with oil-water mixtures via the two vertical pipes 55, each separator bank being equipped with a pressure regulator 58.

Figure 7:
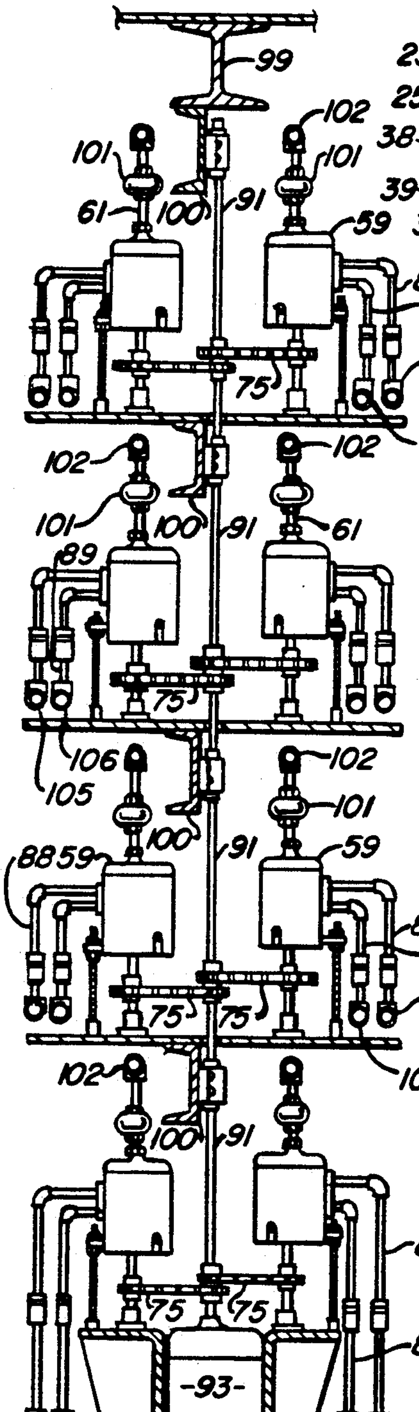
FIG. 7 is an elevational view of an assembly of centrifugal separators arranged into a separator module.
Figure 7:
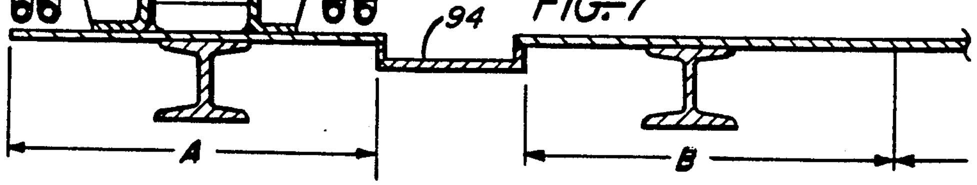
Figure 8:
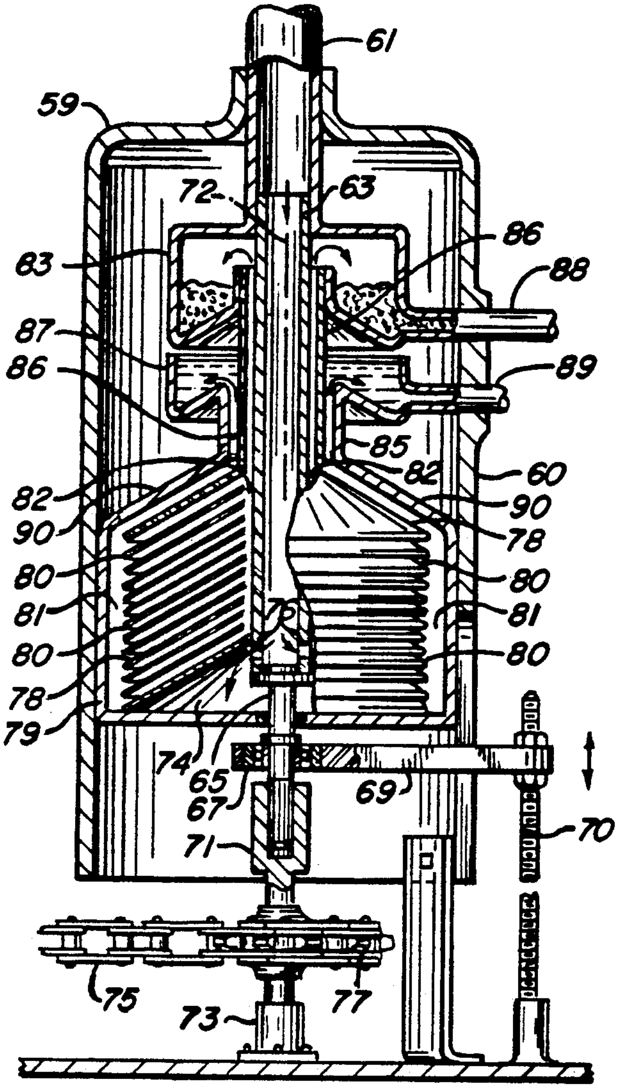
FIG. 8 is an enlarged sectional view taken through a representative one of the centrifugal separators of FIG. 7.

Each separator bank comprises several modules of centrifugal separators. FIG. 8 shows one of the centrifugal separators, and FIG. 7 shows a module containing eight separators 59. As shown in FIG. 8, an individual separator comprises an upright stationary cylindrical housing 60 having a liquid admission tube 61 which forms a bearing for a hollow rotary shaft member 63. A solid rotary shaft member 65 extends downwardly from shaft member 63 through an anti-friction support bearing 67 mounted in an arm 69. Arm 69 is connected to a vertical screw 70 for vertical adjustment of the position of the rotary shaft assembly.

The lower end portion of shaft member 65 is slidably keyed to a third rotary shaft member 71 that is supported in a foot bearing 73. As shown fragmentarily in FIG. 8, a drive chain 75 extends around a sprocket 77 carried by shaft member 71, so that the three shaft members 71, 65 and 63 can be powered as a unit around the shaft axis 72.

Shaft member 63 carries a number of coned or conical disks 78 within the space formed by a stationary housing member 79. Each disk has a number of apertures 80 therein spaced inwardly from its outer edge, whereby liquid can flow upwardly through the apertures, as indicated by arrows in FIG. 8, to reach the various annular spaces defined between the conical disks. The liquid mixture flows through a plurality of holes 76 in shaft member 63, two of which are shown, into space 74, and thence upwardly through apertures 80 to reach the various disk spaces.

As the shaft-disk assembly rotates, centrifugal forces on the liquid in the disk spaces causes the relatively heavy water to move predominately into the annular space 81 at the outer peripheral edges of the disks, while the lighter less dense oil migrates into the annular space 82 at the inner edges of disks 78. The oil-water mixture supplied through tube 61 is under a positive pressure, which causes the separated oil to flow upwardly along the outer surface of shaft member 63 into a stationary annular oil collection tray 83. The separated water flows upwardly through the space between stationary tubes 85, 86 into a water collection tray 87. The separated oil and water drain from the respective trays into drain lines 88 and 89, respectively.

The centrifugal separator shown in FIG. 8 is well-known, having been used in the milk industry to separate butterfat from skim milk. In such context, the butterfat is analogous to the oil, and the skim milk is analogous to the water. The separating efficiency of the separator is relatively high, i.e., in excess of ninety-nine per cent.

The adjustment provided by arm 69 and threaded rod 70 is for the purpose of moving the coned disks 78 toward or away from the stationary roof member 90. Upward adjustment of the conical disks reduces the size of the flow path formed between roof member 90 and the uppermost disk 78, thus somewhat impeding the water flow. This action somewhat improves oil collection efficiency when the water content in the mixture is low or the density differences are small. When the water content is high and the oil content low, the coned disks are adjusted downwardly. The adjustment is relatively small and made to meet changing conditions.

FIG. 7 shows a module comprised of eight centrifugal separators of the type shown in FIG. 8. There are two vertical rows of separators, with each row having four separators arranged one above another in vertical alignment. Each separator has its vertical drive shaft equidistant from an elongated drive shaft 91 of an electric motor 93. Shaft 91 carries sprockets spaced along its length for transmitting driving force from shaft 91 to the various shafts of the centrifugal separators. Drive chains 75 extend about the horizontal sprockets.

As shown in FIG. 7, motor shaft 91 is in a common vertical plane with the drive shafts of the various separators in the separator module. The transverse dimension of the module is indicated at A. The transverse dimension of the module normal to the plane of FIG. 7 is about one-fourth the dimension indicated at A. Centrifugal separator modules are placed directly behind the module shown in FIG. 7, thus enabling a relatively large number of modules to be accommodated in the floor area indicated at A. Typically, a row of twelve modules will be provided in space A.

The space to the right of the illustrated module is occupied by a walkway 94. Another row of modules (not shown) may be positioned to the right of walkway 94 in the space indicated at B.

Figure 10:
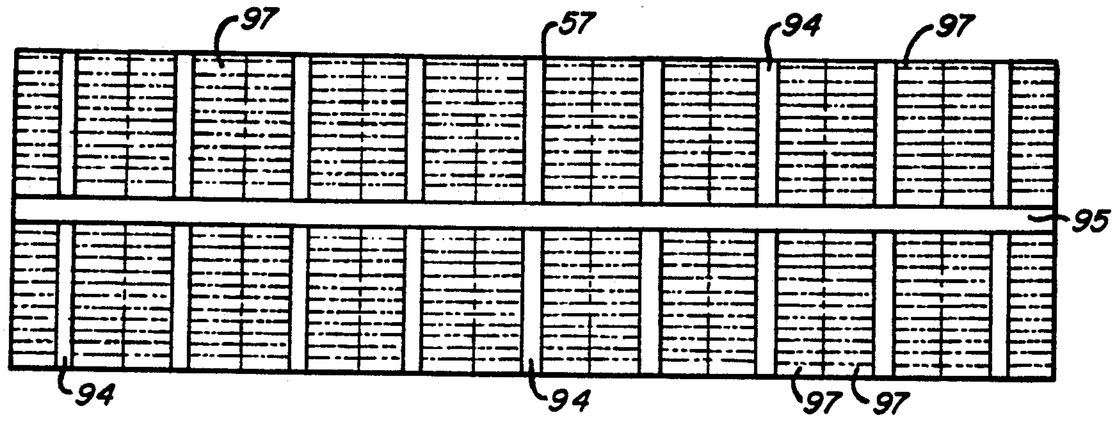
FIG. 10 is a plan view of a bank of separator modules.

FIG. 10 is a plan view of a schematic representation of a module arrangement that may be employed to form one of the separator banks 57 (FIG. 2). The depicted system comprises a central walkway 95 and a series of branch walkways 94 extending at right angles to walkway 95 and spaced therealong. Each module is depicted in FIG. 10 as a rectangle 97. A relatively large number of modules can be accommodated in the depicted area. Each module borders one of the walkways, thus enabling a maintenance employee to have access to any given module for repair or replacement purposes.

Figure 11:
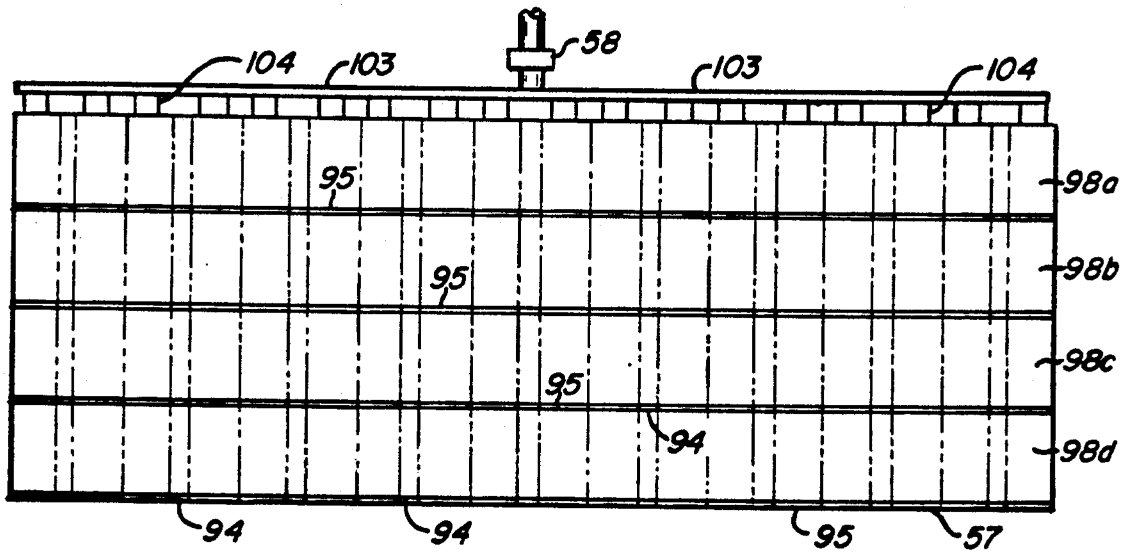
FIG. 11 is a side elevational view of the bank of modules of FIG. 10.

FIG. 11 is a side elevational view of the separator bank depicted in FIG. 10, which has four levels of modules **98*a*, 98*b*, 98*c* and 98*d*. At each level there is a system of walkways, like walkway system depicted in FIG. 10. The walkways at the different levels are interconnected with ladders (not shown), whereby persons are enabled to move from one level to another. FIGS. 10 and 11 schematically illustrate a separator module arrangement which can be employed to form any one of the six separator banks shown in block form in FIGS. 2 and 3**.

Referring again to FIG. 7, the separator module is partially supported at its lower end on an I-beam 99. The I-beam is preferably about the same length as the associated walkway 94 so that the I-beam provides support for the entire array of modules bordering walkway 94. Four additional beams 100 extend horizontally directly above beam 99 to provide support for elongated shaft 91 and the platforms which support the piping and separator components. Each beam 100 has approximately the same length as I-beam 99, so that each beam 100 furnishes support for a multiple number of motor drive shafts 91. The various beams 99 and 100 are interconnected with other similar beams (not shown) to form a grid-like support system for the various separator modules at given levels **98*a*, 98*b*, 98*c* or 98*d* (FIG. 11**).

The oil-water mixture is supplied to each centrifugal separator through a vertical tube 61 that extends downwardly from a pressure regulator or flow control valve 101, in order that each separator is supplied with the liquid quantity that will achieve a desired separation efficiency. Each regulator 101 is required to handle only a relatively small flow, e.g., less than five gallons per minute. Therefore each regulator can be a relatively small, low cost device of the type commonly used to provide a relatively constant flow rate in clothes washing machines and other plumbing systems.

Horizontal overhead pipes 102 extend above the various separators to supply the oil-water mixture to the various vertical tubes 61. Each pipe 102 has one end thereof connected to a vertical pipe that extends downwardly from an overhead distributor pipe extending the length of the separator bank approximately on the longitudinal centerline of the separator bank. FIG. 11 shows the piping system as comprising an overhead distributor pipe 103 and a number of vertical pipes 104 (two for each separator module). Each pipe 104 extends downwardly from pipe 103 a sufficient distance to reach the various horizontal pipes 102 shown in FIG. 7. Pipes 102 extend from pipes 104 in opposite directions parallel to walkways 97. With the particular system shown in the drawings, each vertical pipe 104 supplies the oil-water mixture to thirty-two horizontal pipes 102 (four pipes per module).

As shown in FIG. 8, the separated water and oil are directed into separate drain lines 89 and 88. Such lines extend downwardly to horizontal drain lines indicated at 105, 106 in FIG. 7. All of the various drain lines connect to vertical lines bordering central walkways 95, whereby the separate oil and water streams can be eventually merged together to form two streams, 107 and 108 (FIG. 2). As motor-operated pump 109 may be employed to pump the separated water back into the surrounding body of water. Another pump 110 may be employed to pump the separated oil into a tanker or other vessel (not shown) for transport away from the scene.

Figure 9:
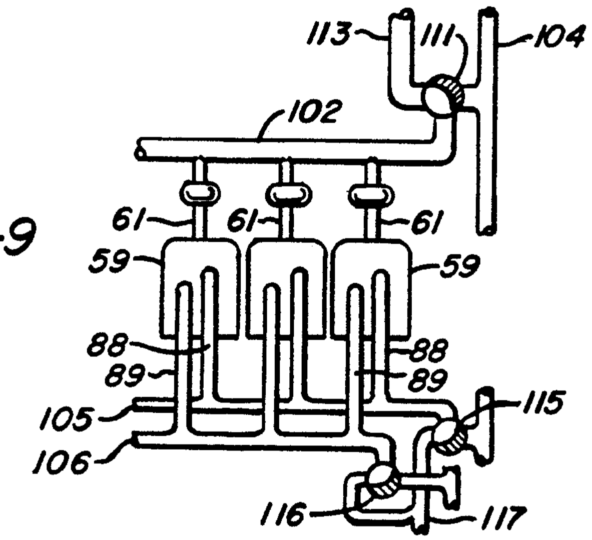
FIG. 9 is a schematic illustration of a diverter valve system that may be utilized to effect removal of sludge accumulations from the centrifugal separators of FIG. 7.

During the operation of the centrifugal separators, there is a possibility that sludge accumulations will develop in the separator passages, e.g., within the spaces formed between coned disks 78. The individual separators can be cleaned by pumping hot water through the separator passages. FIG. 9 schematically illustrates a system of diverter valves that can be used to temporarily connect a selected number of separators to a source of hot water, whereby those separators are cleaned of sludge accumulations. As shown, a three-way valve 111 connects an overhead line 102 to a hot water line 113, whereby the associated separators 59 are adapted to receive separate streams of hot water through tubes 61. Diverter valves 115 and 116 are arranged to direct the spent cleaning water into a drain line 117 for disposal. The spent fluid can be directed to a settling tank 119 (FIG. 2) for eventual isolation of the sludge.

The diverter valve system shown in FIG. 9 is used to temporarily connect all of the separators associated with a given pipe 102 to a hot water source for cleaning purposes. The valve system can be duplicated for the other pipes 102 in the system, such that different groups of separators can be cleaned according to a predetermined schedule. If it is desired to clean a greater number of separators in a given cleaning cycle, then the diverter valves may be located at other points in the piping system, e.g., on pipes 104. In any case, only a minor number of separators will be undergoing a cleaning cycle at any one time. The cleaning system therefore does not significantly reduce the capacity of the overall oil separator system.

The invention is concerned primarily with the structure of an individual separator module, as depicted in FIGS. 7 and 8, and the module arrangement as depicted in FIGS. 10 and 11. The system can achieve both a desirably high separation efficiency and a desirably high total flow capacity. A relatively large number of centrifugal separators is used, whereby a shutdown of one or more separators does not significantly affect the overall operation of the system.

Thus there has been shown and described a novel oil-spill clean-up apparatus which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

The inventor claims:

1. An apparatus for removing oil and other liquids spilled onto a navigable body of water, comprising:

a vessel, a substantial plurality of centrifugal separator modules disposed within said vessel, each separator module comprising a plurality of individual centrifugal separators in an array wherein respective separators are disposed at respective progressively higher elevations, each centrifugal separator having a drive shaft, electric motor means for driving the arrays of separators, said motor means including drive shaft means extending to the arrays of separators, power transmission means interconnecting said motor means drive shaft means and each associated separator drive shaft, and means carried by said vessel for collecting a liquid spill material mixture from the body of water and for transporting the mixture in a generally parallel manner to the modules.

2. The apparatus of claim 1, wherein there are at least four separators in each module.

3. The apparatus of claim 1, wherein:

each module comprises two vertical rows of separators, and the separators in each row are arranged one above another in vertical alignment.

4. The apparatus of claim 3, wherein the separators in each module have their drive shafts equidistant from the associated motor means drive shaft.

5. The apparatus of claim 4, wherein:

each force transmission means comprises a first sprocket carried on the motor drive shaft, a second sprocket carried on the associated separator drive shaft, and a chain trained around the sprockets.

6. The apparatus of claim 4, wherein each motor drive shaft is disposed in a common vertical plane with the associated separator drive shafts.

7. The apparatus of claim 6, wherein the modules are so constructed that the common drive shaft planes in the different modules are parallel, whereby the separator modules are compactly arranged in a rectangular grid pattern.

8. The apparatus of claim 7, and further comprising:

means for supporting each motor drive shaft, said shaft support means comprising multiple horizontal beams extending through different modules so that a given beam supports a multiplicity of motor drive shafts.

9. The apparatus of claim 8, wherein said multiple support beams are in vertical alignment, whereby each motor drive shaft is supported at vertically spaced points along its length.

10. The apparatus of claim 9, wherein each support beam constitutes a support mechanism for individual centrifugal separators in different ones of the modules.

11. The apparatus of claim 1, wherein:

the drive shaft of each centrifugal separator comprises a vertical hollow rotary shaft member having a liquid admission port at its upper end, and each separator comprises a multiplicity of coned disks encircling said hollow shaft member for rotation therewith, an annular water tray located above said coned disks in communication with the disk outer edges, and an annular oil tray disposed above said water tray and in communication with the disk inner edges.

12. The apparatus of claim 11, wherein:

the drive shaft of each separator comprises a lower rotary shaft member slidably keyed to an associated hollow shaft member, whereby each said hollow shaft member is vertically adjustable on the associated lower shaft member to adjust the positions of the coned disks to achieve a separating action with oils of different densities.

13. The apparatus of claim 11, and further comprising:

means for periodically circulating hot water through each separator to remove sludge accumulations.

14. The apparatus of claim 13, wherein:

said hot water circulating means comprises diverter valve means adjustable to temporarily isolate a selected number of separators from the other separators, whereby hot water can be circulated through the selected separators without affecting the operation of the other separators.

15. The apparatus of claim 1, wherein:

said separator modules are arranged side-by-side in parallel rows, selected rows of modules being spaced apart to form linear free spaces therebetween, and a horizontal walkway extends along each free space to provide access to the modules by maintenance persons.

16. The apparatus of claim 1, wherein:

said modules are disposed one above another at different levels within the vessel, said means for transporting the oil-water mixture to the separators comprises an array of vertical pipes for transporting the liquid mixture downwardly from one level to another level, and an array of horizontal pipes extend from the vertical pipes for delivering the liquid mixture to the modules at a predetermined level.

17. The apparatus of claim 1, wherein:

each centrifugal separator comprises a vertical hollow rotary shaft member adapted for downflow of liquid, and a flow control device located above said hollow shaft member for regulating the flow therethrough.

18. The apparatus of claim 17, wherein each flow control device is a pressure regulator.

19. The apparatus of claim 1, and further comprising:

a heater disposed to heat the oil-water mixture while being transported to the separators.

20. The apparatus of claim 1, wherein:

said transporting means comprises a platform floatably disposed on the body of water, said platform comprising an annular pontoon assembly having passages extending transversely therethrough, whereby oil and water can flow into or out of the space circumscribed by the pontoon assembly.

* * * * *